US010172297B2

(12) United States Patent
Lee et al.

(10) Patent No.: US 10,172,297 B2
(45) Date of Patent: Jan. 8, 2019

(54) MONITORING AND CONTROL SYSTEM AND METHOD FOR PLANT FACTORY BASED ON TV WHITE SPACES

(71) Applicant: Foundation of Soongsil University-Industry Cooperation, Seoul (KR)

(72) Inventors: Woncheol Lee, Seoul (KR); Hyungmin Chang, Seoul (KR); Joopyoung Choi, Seoul (KR); Deokwon Yun, Suwon-si (KR); Kyumin Park, Incheon (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 342 days.

(21) Appl. No.: 14/964,888

(22) Filed: Dec. 10, 2015

(65) Prior Publication Data

US 2016/0165812 A1   Jun. 16, 2016

(30) Foreign Application Priority Data

Dec. 11, 2014 (KR) .................. 10-2014-0178506
Mar. 31, 2015 (KR) .................. 10-2015-0044803

(51) Int. Cl.
*A01G 9/24* (2006.01)
*G05B 15/02* (2006.01)

(52) U.S. Cl.
CPC .............. *A01G 9/24* (2013.01); *G05B 15/02* (2013.01); *G05B 2219/2642* (2013.01)

(58) Field of Classification Search
CPC ... A01G 9/24; G05B 15/02; G05B 2219/2642
See application file for complete search history.

(56) References Cited

U.S. PATENT DOCUMENTS

2013/0003591 A1*   1/2013   Novak ............... H04W 72/085
                                                            370/252

FOREIGN PATENT DOCUMENTS

KR   10-2013-0047845 A   5/2013
KR   10-2013-0071325 A   6/2013
(Continued)

OTHER PUBLICATIONS

Hwang et al. ("A Wireless Sensor Network-Based Ubiquitous Paprika Growth Management System," Sensors, 10, pp. 11566-11589, 2010).*

(Continued)

*Primary Examiner* — Yasser A Abdelaziez
(74) *Attorney, Agent, or Firm* — Novick, Kim & Lee, PLLC; Sang Ho Lee

(57) ABSTRACT

A monitoring and control system and method for a plant factory based on TV white spaces (TVWSs) are disclosed. The monitoring and control system for the plant factory includes a sensor assembly installed inside and outside a plant factory and measuring an environmental state, an actuator assembly installed inside the plant factory and creating a growing environment, and a central data processing assembly assigning a TV white space (TVWS) channel to the sensor assembly and the actuator assembly, receiving the environmental state from the sensor assembly through the TVWS channel, generating a control signal controlling the actuator assembly to meet a predetermined conditions for an internal environment of the plant factory for an optimal state of growth of crops in response to the environmental state, and transmitting the control signal to the actuator assembly through the TVWS channel.

8 Claims, 7 Drawing Sheets

(56) References Cited

FOREIGN PATENT DOCUMENTS

| KR | 101321337 B1 | 10/2013 |
| KR | 10-2014-0042297 A | 4/2014 |
| KR | 10-2014-0078314 A | 6/2014 |

OTHER PUBLICATIONS

Namhyun Yoo et al., "Design and Implementation of the Management System of Cultivation and Tracking for Agricultural Products using USN", Sep. 2009, vol. 15, No. 9, pp. 661-674.

Deok Won Yun et al., "Analysis of TVWS Channel for Transmitting and Receiving Monitoring-Information in the Factory Building" Jun. 2013, pp. 909-910.

\* cited by examiner

MONITORING AND CONTROL SYSTEM AND METHOD FOR PLANT FACTORY BASED ON TV WHITE SPACES

CROSS-REFERENCE TO RELATED APPLICATION

This application claims priority to and the benefit of Korean Patent Application Nos. 10-2014-0178506, filed on Dec. 11, 2014, and 10-2015-0044803, filed on Mar. 31, 2015, the disclosures of which are incorporated herein by reference in their entirety.

BACKGROUND

The present disclosure relates to a monitoring and control system and method for a plant factory based on TV white spaces (TVWSs), and more particularly, to a monitoring and control system and method for a plant factory, which transmits and receives information to and from operating apparatuses installed inside and outside the plant factory through TVWS-based wireless communication.

Recently, crop growing methods using plant factories, in which environmental conditions such as temperature, light, $CO_2$, culture media, and the like affecting growth of crops in the facility are controlled, work processes are automated, and crops can be continuously grown regardless of weather conditions, have been vitalized.

In the crop growing methods using plant factories, since it is important to appropriately maintain the environmental conditions such as temperature, humidity, $CO_2$, light, and the like and to quickly respond to changes in the environmental conditions, various plant factory monitoring and control systems for monitoring and controlling the environmental conditions in a plant factory have been used. Wireless local area networks (WLANs), ZigBee, and cellular communication methods based on 2.4 GHz industrial, scientific, and medical (ISM) bands have been mainly applied to monitoring and control systems used in plant factories.

Although using WLANs and ZigBee communication methods without extra charge, among the communication methods applied to the conventional plant factory monitoring and control systems having advantages, the communication is possible in a relatively high frequency band, and thus the communication is possible in a relatively small range of a communication distance up to 30 m. The cellular communication method also continuously incurs costs during wireless communication with various operating apparatuses.

Therefore, there is a need to develop a plant factory monitoring and control system in which the communication within a wide range is possible using a lower frequency band than the wireless communication method based on the ISM bands and to which a reasonably priced wireless communication method is applied.

SUMMARY OF THE DISCLOSURE

One aspect of the present disclosure provides a plant factory monitoring and control system, in which an environmental state of an inside and outside of a plant factory is monitored and the environmental state of the inside of the plant factory is controlled.

One aspect of the present disclosure provides a wireless communication method based on TV white spaces (TVWSs), in which information is transmitted to and received from operating apparatuses installed inside and outside a plant factory through TVWS-based wireless communication. A plant factory monitoring and control system includes a sensor assembly installed inside and outside a plant factory and measuring an environmental state, an actuator assembly installed inside the plant factory and creating a growing environment, and a central data processing assembly assigning a TV white space (TVWS) channel to the sensor assembly and the actuator assembly, receiving the environmental state from the sensor assembly through the TVWS channel, generating a control signal controlling the actuator assembly to meet a predetermined conditions for an internal environment of the plant factory for an optimal state of growth of crops in response to the environmental state, and transmitting the control signal to the actuator assembly through the TVWS channel.

The sensor assembly includes a sensor installed inside and outside the plant factory and measuring at least one of temperature, humidity, $CO_2$, electrical conductivity (EC), illuminance, light intensity, culture medium temperature, culture medium moisture, solar radiation, wind velocity, a wind direction, and rainfall. The sensor includes a TVWS communication terminal performing TVWS communication.

The actuator assembly includes an actuator including at least one of artificial lighting, a humidifier, a dehumidifier, a water supply, a ceiling motor, a side window motor, a curtain motor, a screen motor, a flow fan, a ventilation fan, a $CO_2$ supply, a convection fan, an air conditioner, and a heater, which is installed inside the plant factory. The actuator includes a TVWS communication terminal performing a TVWS communication.

An assignment of the TVWS channel to the sensor assembly and the actuator includes connecting to a TVWS management server, requesting a TVWS channel list based on locations of the central data processing assembly, the sensor assembly, and the actuator from the TVWS management server, receiving the TVWS channel list from the TVWS management server, selecting at least one TVWS channel from the TVWS channel list, and assigning the at least one TVWS channel to the central data processing assembly, the sensor assembly, and the actuator.

The selecting of the at least one TVWS channel and the assigning of the at least one TVWS channel include selecting a TVWS channel from the at least one TVWS channel included in the TVWS channel list according to at least one of coverage, transmission power, and a degree of interference in the vicinity, and assigning the TVWS channel to the central data processing assembly, the sensor assembly, and the actuator.

The selecting of the TVWS channel includes selecting a first TVWS channel from the TVWS channel list, the first TVWS channel assigned the inside and outside of the plant factory and covering the central data processing assembly, the sensor assembly, and the actuator which are installed inside and outside the plant factory.

The selecting of the TVWS channel further includes grouping the central data processing assembly, the sensor assembly, and the actuator installed in a region adjacent to the inside and outside of the plant factory, and selecting a plurality of TVWS channels covering the central data processing assembly, the sensor assembly, and the actuator from a corresponding group, and assigning the plurality of TVWS channels to each of the corresponding group.

The selecting of the TVWS channel further includes selecting at least one TVWS channel from the TVWS channel list, dividing the at least one TVWS channel into a plurality of sub-channels, and assigning the plurality of sub-channels to the sensor assembly and the actuator.

The central data processing assembly transmits and receives information to and from the sensor assembly and the actuator through the TVWS channel by applying a time division multiplexing (TDM) communication method or a code division multiplexing (CDM) communication method.

According to another embodiment of the present disclosure, a plant factory monitoring and control method is provided. The method includes receiving information corresponding to an environmental state of an inside and outside of a plant factory from a plurality of sensors when the plurality of sensors installed inside and outside the plant factory sense and transmit the environmental state, generating a control signal creating a growing environment of the inside of the plant factory to meet a predetermined conditions for an internal environment of the plant factory for an optimal state for growth of crops in response to the environmental state and transmitting the control signal to a plurality of actuators installed inside the plant factory, and transmitting and receiving the information to and from the plurality of sensors and the plurality of actuators through TVWS-based wireless communication.

The step of the transmitting and receiving of the information includes connecting to a TVWS management server, requesting a TVWS channel list based on locations of a central data processing assembly, the sensor assembly, and the plurality of actuators from the TVWS management server, receiving the TVWS channel list from the TVWS management server, and selecting at least one TVWS channel from the TVWS channel list, assigning the at least one TVWS channel to the central data processing assembly, the sensor assembly, and the actuator, and transmitting and receiving the information to and from the central data processing assembly, the sensor assembly, and the actuator through TVWS-based wireless communication.

The steps of selecting, the assigning, and the transmitting and receiving further includes selecting a first TVWS channel assigned the inside and outside of the plant factory, covering the central data processing assembly, the sensor assembly, and the actuator which are installed inside and outside the plant factory, and transmitting and receiving the information to and from the inside and outside of the plant factory through TVWS-based wireless communication.

The steps of the selecting, the assigning, and the transmitting and receiving further includes grouping the central data processing assembly, the sensor assembly, and the actuator which are installed in a region adjacent to the inside and outside of the plant factory, selecting a plurality of TVWS channels covering the central data processing assembly, the sensor assembly, and the actuator from a corresponding group, performing a link connection of the central data processing assembly, the plurality of sensor assemblies, and the plurality of actuators by applying a multi-hop method, assigning the plurality of TVWS channels to each of the corresponding group, and transmitting and receiving the information through TVWS-based wireless communication.

The steps of the selecting, the assigning, and the transmitting and receiving further includes selecting at least one TVWS channel from the TVWS channel list, dividing the at least one TVWS channel into a plurality of sub-channels, assigning the plurality of sub-channels to the central data processing assembly, the sensor assembly, and the actuator, and transmitting and receiving information to and from the central data processing assembly, the sensor assembly, and the actuator through TVWS-based wireless communication.

The steps of the selecting, the assigning, and the transmitting and receiving includes transmitting and receiving the information to and from the central data processing assembly, the sensor assembly, and the actuator through the TVWS channel by applying a TDM communication method or a CDM communication method.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Detailed descriptions of the disclosure will be made with reference to the accompanying drawings illustrating specific embodiments of the disclosure as examples. These embodiments will be described in detail such that the disclosure can be performed by those skilled in the art. It should be understood that various embodiments of the disclosure are different but are not necessarily mutually exclusive. For example, a specific shape, structure, and characteristic of an embodiment described herein may be implemented in another embodiment without departing from the scope and spirit of the disclosure. In addition, it should be understood that a position or an arrangement of each component in each disclosed embodiment may be changed without departing from the scope and spirit of the disclosure. Accordingly, there is no intent to limit the disclosure to detailed descriptions to be described below. The scope of the disclosure is defined by the appended claims and encompasses all equivalents that fall within the scope of the appended claims. Like numbers refer to the same or like functions throughout the description of the figures.

Hereinafter, exemplary embodiments of the present disclosure will be described in more detail with reference to the accompanying drawings.

Figure 1:
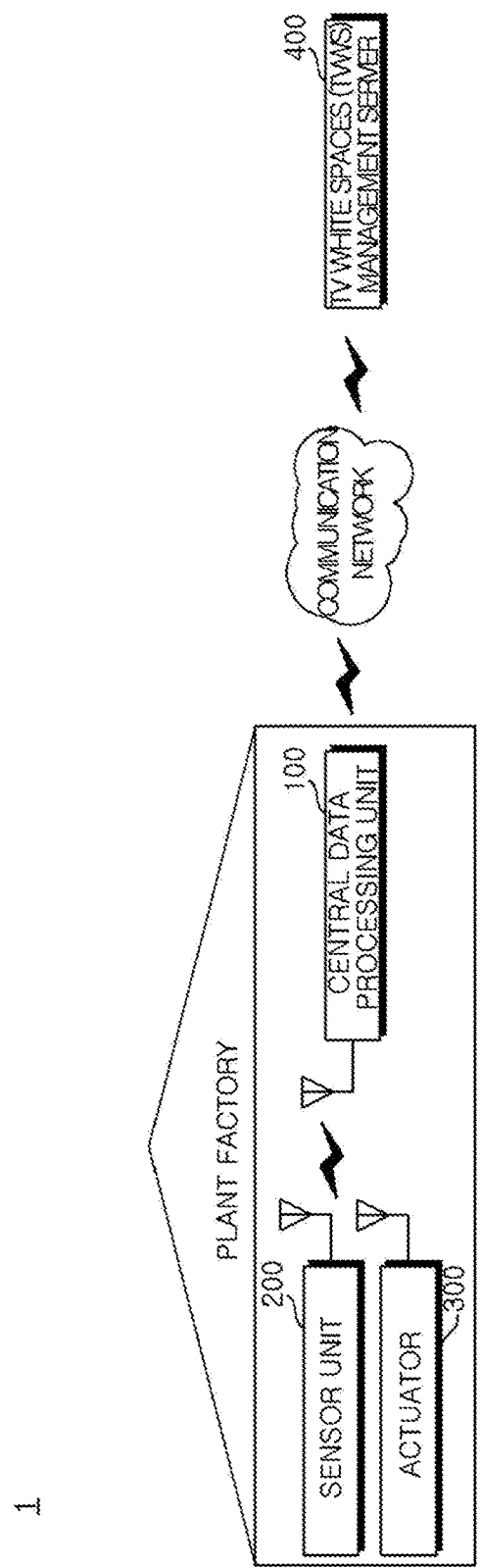
FIG. 1 is a diagram illustrating a plant factory monitoring and control system according to an embodiment of the present disclosure.

FIG. 1 is a diagram illustrating a plant factory monitoring and control system according to an embodiment of the present disclosure.

Referring to FIG. 1, a plant factory monitoring and control system 1 may include a central data processing unit 100, a sensor unit 200, an actuator 300, and a TV white space (TVWS) management server 400.

The central data processing unit 100 may receive an environmental state of the inside and outside of a plant factory from the sensor unit 200, generate a control signal for creating a growing environment in the plant factory according to the environmental state, and transmit the control signal to the actuator 300.

In particular, the central data processing unit 100 may receive the environmental state of the inside and outside of the plant factory from the sensor unit 200 through TVWS-based wireless communication. In this case, the environmental state may include all environmental factors affecting growth of crops, such as temperature, humidity, $CO_2$, rainfall, air volume, and the like.

Further, the central data processing unit 100 may generate the control signal for creating the growing environment to meet predetermined conditions so that an internal environment of the plant factory reaches an optimal environmental state for the growth of the crops according to the received environmental state, and transmit the control signal to the actuator 300 through the TVWS-based wireless communication. In this case, the control signal may include a signal for controlling at least one of light intensity, air-conditioning, humidification, dehumidification, water, $CO_2$, and the like through the actuator 300.

In particular, the central data processing unit 100 may be connected to the TVWS management server 400 in order to perform the TVWS-based wireless communication with the sensor unit 200 and the actuator 300, and may receive a TVWS channel list including at least one TVWS channel available inside and outside the plant factory based on location information on the central data processing unit 100, the sensor unit 200, and the actuator 300. The central data processing unit 100 may select at least one TVWS channel suitable for use inside and outside the plant factory from the TVWS channel list received from the TVWS management server 400, assign the selected TVWS channel to the central data processing unit 100, the sensor unit 200, and the actuator 300, and thus perform the wireless communication.

In this case, the central data processing unit 100 may entirely assign the TVWS channel inside and outside the plant factory, or may assign the TVWS channel to each group by grouping the central data processing unit 100, the sensor unit 200, and the actuator 300, which are installed in a region adjacent to the inside and outside of the plant factory. Further, the central data processing unit 100 may assign a plurality of sub-channels into which the TVWS channel is divided. A method of assigning the TVWS channel to the central data processing unit 100 will be described below in detail.

Here, the TVWS refers to a band of an empty channel that is not locally allocated and not used among TV broadcasting bands. The TVWS-based wireless communication has an excellent electric wave characteristic and uses a lower frequency band than a communication method in which a band of 1 GHz or more is used such as a band in a range of 470 MHz to 698 MHz, and thus may provide wide coverage. Therefore, when the TVWS-based wireless communication is used in a plant factory of the same size, fewer wireless systems are installed than when typical wireless communication is used, and thus installation costs and configuration costs of the network can be reduced. Further, the TVWS-based wireless communication may not continuously incur costs, and may be applied to other places that the communication network does not reach. In addition, when the TVWS channel divided into a plurality of sub-channels is used, limited frequency usage of the TVWS channel can be increased.

Further, the central data processing unit 100 may be implemented in the form of hardware in which various types of communication are possible, a storage space is provided, and a predetermined calculation is possible, may be installed inside or outside the plant factory within a distance in which communication with the sensor unit 200 and the actuator 300 through the TVWS communication is possible, or may be implemented in a mobile manner.

Meanwhile, a plurality of sensor units 200 may be installed at main locations of the inside and outside of the plant factory and may measure environmental states. That is, the sensor unit 200 may include at least one sensor for measuring at least one of temperature, humidity, electrical conductivity (EC), $CO_2$, illuminance, light intensity, culture medium temperature, culture medium moisture, wind velocity, a wind direction, rainfall, and the like. The sensor unit 200 may measure the environmental states of the inside and outside of the plant factory according to a predetermined period or a request of the central data processing unit 100. Further, each of the plurality of sensor units 200 may include a TVWS communication terminal that can perform the TVWS communication, and may serve as a relay which relays signals to other sensor units 200 or actuators 300 in order to expand a TVWS communication region.

A plurality of actuators 300 may be installed at the main locations of the inside of the plant factory and may create a growing environment. That is, the actuator 300 may include at least one of artificial lighting, a humidifier, a dehumidifier, a water supply, a ceiling motor, a side window motor, a curtain motor, a screen motor, a flow fan, a ventilation fan, a $CO_2$ supply, a convection fan, an air conditioner, a heater, and the like. Further, each of the plurality of actuators 300 may include a TVWS communication terminal that can perform the TVWS communication, and may serve as a relay which relays signals to other sensor units 200 or actuators 300 in order to expand a TVWS communication region.

The TVWS management server 400 may manage TVWS channels to efficiently use the TVWS channels. The TVWS management server 400 may calculate or store information on the TVWS channels available for each region and allowable transmission power of each TVWS channel, and provide the information on the TVWS channel available in the plant factory when a TVWS channel request is received from the central data processing unit 100.

In particular, when the TVWS management server 400 receives the location information on the central data processing unit 100, the sensor unit 200, and the actuator 300, which are installed inside and outside the plant factory from the central data processing unit 100, the TVWS management server 400 may transmit the information on the TVWS channel available at a corresponding location among 37 channels in a range of 470 MHz to 698 MHz to the central data processing unit 100.

Figure 2:
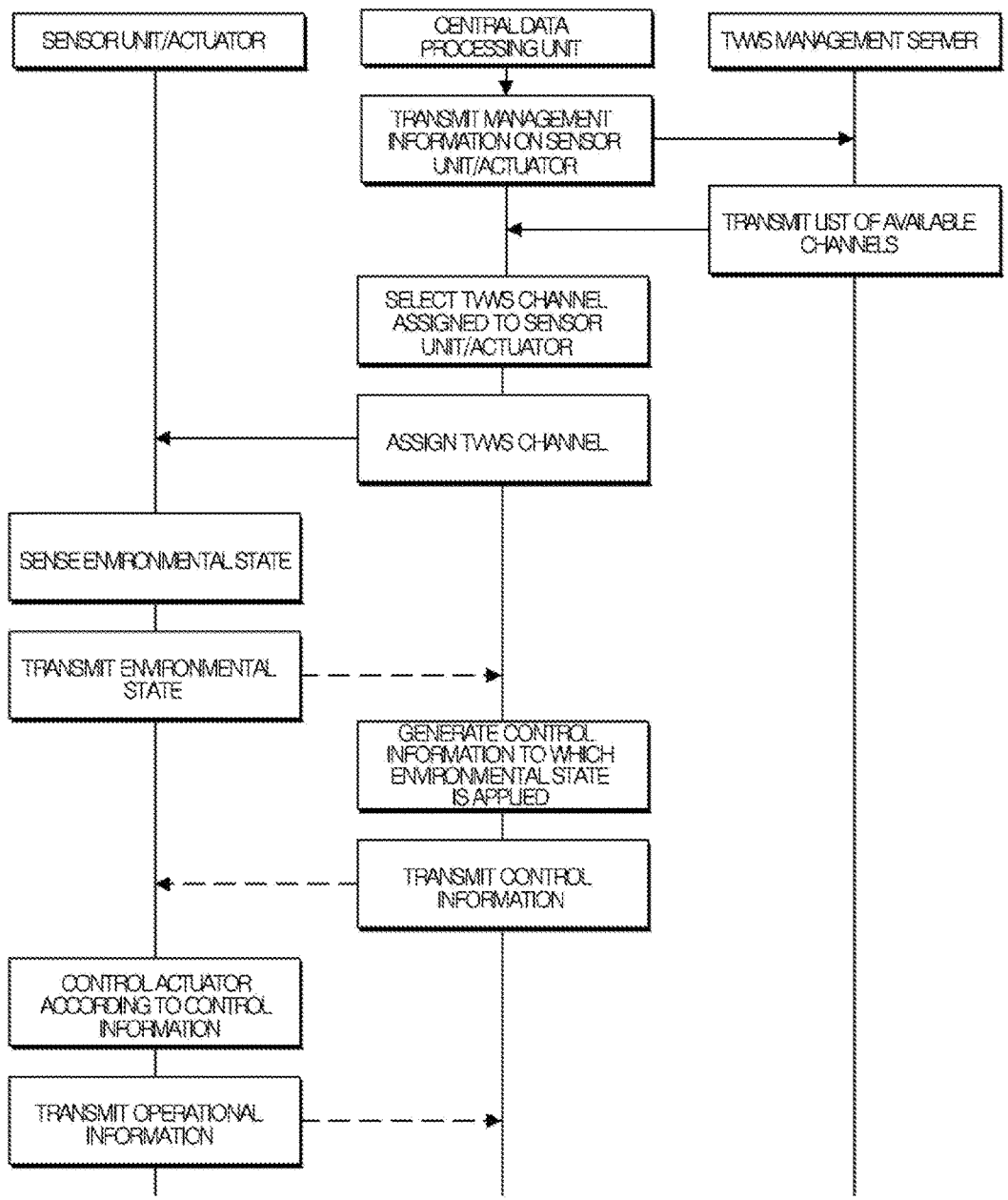
FIG. 2 is a diagram illustrating a data flow of the plant factory monitoring and control system illustrated in FIG. 1.

FIG. 2 is a diagram illustrating a data flow of the plant factory monitoring and control system 1 illustrated in FIG. 1. In FIG. 2, the TVWS-based wireless communication is represented by dotted lines and other general communication is represented by solid lines.

Referring to FIG. 2, first, the central data processing unit 100 may transmit management information on the central data processing unit 100, the sensor unit 200, and the actuator 300 to the TVWS management server 400. In this case, the central data processing unit 100 may transmit the management information including the location information on the central data processing unit 100, the sensor unit 200, and the actuator 300 to the TVWS management server 400 and request a TVWS channel based on corresponding information from the TVWS management server 400.

The TVWS management server 400 may transmit a TVWS channel list including at least one TVWS channel available at the locations of the central data processing unit 100, the sensor unit 200, and the actuator 300 to the central data processing unit 100 in response to the channel request of the central data processing unit 100.

Then, the central data processing unit 100 may select a TVWS channel most suitable for assignment to the central data processing unit 100, the sensor unit 200, and the actuator 300 from the TVWS channel list received from the TVWS management server 400, assign the selected TVWS channel to the central data processing unit 100, the sensor unit 200, and the actuator 300, and perform a link connection to enable the TVWS-based wireless communication. A method of the central data processing unit 100 assigning the TVWS channel to the sensor unit 200 and the actuator 300 will be described below in detail.

Meanwhile, the sensor units 200 installed inside and outside the plant factory may sense the environmental state of the inside and outside of the plant factory.

The sensor unit 200 may transmit the sensed environmental state of the inside and outside of the plant factory to the central data processing unit 100 through the TVWS channel assigned by the central data processing unit 100. In this case, the sensor unit 200 may sense the environmental state of the inside and outside of the plant factory according to a predetermined period or a request of the central data processing unit 100 and transmit the environmental state to the central data processing unit 100.

The central data processing unit 100 may generate control information for controlling an internal environment of the plant factory by applying the received environmental state from the sensor unit 200 to the control information. The central data processing unit 100 may generate a control signal for controlling the actuator 300 so that the internal environment of the plant factory reaches an optimal state for growth of crops, and transmit the control signal to the actuator 300 through the TVWS channel.

The actuator 300 may receive the control information from the central data processing unit 100 through the TVWS channel assigned by the central data processing unit 100 and control the actuator 300 so that the internal environment of the plant factory is maintained in the optimal state for growth of crops according to the control information.

Further, the actuator 300 may transmit operational information including a current operational state, whether or not there is a malfunction, and the like to the central data processing unit 100 through the TVWS channel.

Hereinafter, a configuration and operational principle of the plant factory monitoring and control system 1 according to the embodiment of the present disclosure will be described in detail with reference to FIGS. 3 to 6.

Figure 3:
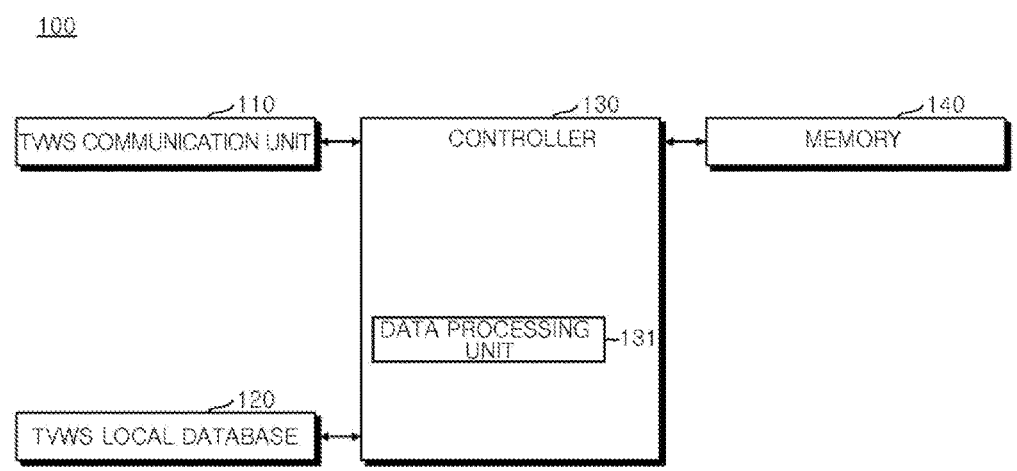
FIG. 3 is a control block diagram illustrating a central data processing assembly illustrated in FIG. 1.

FIG. 3 is a control block diagram illustrating the central data processing unit 100 illustrated in FIG. 1.

Referring to FIG. 3, the central data processing unit 100 may include a TVWS communication unit 110, a TVWS local database 120, a controller 130, and a memory 140.

The TVWS communication unit 110 may perform the TVWS-based wireless communication with the sensor unit 200 and the actuator 300. The TVWS communication unit 110 may perform wireless communication with the sensor unit 200 and the actuator 300 through a link connection when the controller 130 assigns the TVWS channel to the sensor unit 200 and the actuator 300. That is, the TVWS communication unit 110 may receive the environmental state of the inside and outside of the plant factory from the sensor unit 200 according to a predetermined period or receive corresponding information by requesting sensing of the environmental state of the inside and outside of the plant factory from the sensor unit 200, and transmit a control signal to the actuator 300 and receive operational information including a current operational state, whether or not there is a malfunction, and the like from the actuator 300.

Further, the TVWS communication unit 110 may receive a list of available TVWS channels and allowable transmission power of each of the TVWS channels from the TVWS management server 400 in order to perform the TVWS-based wireless communication with the sensor unit 200 and the actuator 300. In this case, the TVWS communication unit 110 may be connected to the TVWS management server 400 through various communication networks such as the Internet, a cellular network, and the like, and may request and receive the TVWS channel list and an amount of the transmission power of each TVWS channel from the TVWS management server 400 based on the location information on the central data processing unit 100, the sensor unit 200, and the actuator 300, which are stored in the TVWS local database 120.

As described above, the TVWS local database 120 may store the management information including the location information on the central data processing unit 100, the sensor unit 200, and the actuator 300. In this case, the location information on the central data processing unit 100, the sensor unit 200, and the actuator, which is stored in the TVWS local database 120, may be manually input by a user, or automatically stored in a module for identifying a self-location and transmitting the information, which is further provided in the sensor unit 200 and the actuator 300.

Further, the TVWS local database 120 may store management information including a unique number and location information on each of the TVWS communication terminals provided in the sensor unit 200 and the actuator 300 in conjunction to use it when the TVWS management server 400 requests the TVWS channel from the TVWS communication unit 110.

Further, the TVWS local database 120 may also store information on the TVWS channel assigned to the central data processing unit 100, the sensor unit 200, and the actuator 300 and being used by the controller 130 in order to immediately respond to a request for the TVWS channel information being used from the TVWS management server 400.

The controller 130 may include a data processing unit 131 for controlling overall operations of the central data processing unit 100.

The controller 130 may select a TVWS channel from the list of the available TVWS channels received from the TVWS management server 400 according to at least one of coverage, transmission power, a degree of interference in the vicinity, and the like, and assign the TVWS channel to the central data processing unit 100, the sensor unit 200, and the actuator 300, which are installed inside and outside the plant factory. That is, the controller 130 may select a TVWS channel that can cover the central data processing unit 100, the plurality of sensor units 200, and the actuator 300, which are installed inside and outside the plant factory, from at least one of the TVWS channels included in the TVWS channel list received from the TVWS management server 400, the TVWS channel to which highest transmission power is assigned, or the TVWS channel which receives the least interference, and assign the selected TVWS channel to the central data processing unit 100, the sensor unit 200, and the actuator 300.

In this case, the controller 130 may select one TVWS channel that can cover all of the central data processing unit 100, the sensor unit 200, and the actuator 300, which are installed inside and outside the plant factory, from the list of the available TVWS channels received from the TVWS management server 400, entirely assign the one TVWS channel to the inside and outside of the plant factory, and perform wireless communication with the central data processing unit 100, the plurality of sensor units 200, and the actuator 300 through the one TVWS channel by applying various division communication methods such as a time division multiplexing (TDM) communication method, a code division multiplexing (CDM) communication method, and the like.

Alternatively, the controller 130 may group the central data processing unit 100, the sensor unit 200, and the actuator 300, which are installed in a region adjacent to the inside and outside of the plant factory, select the plurality of TVWS channels included in the corresponding group that can cover the central data processing unit 100, the sensor unit 200, and the actuator 300, assign the TVWS channels to the groups, perform link connection of the central data processing unit 100 and the plurality of sensor units 200 and actuators 300 by applying a multi-hop method, and perform wireless communication with the plurality of sensor units 200 and actuators 300 through one TVWS channel by applying various division communication methods such as a TDM communication method, a CDM communication method, and the like.

Meanwhile, the controller 130 may divide the TVWS channel selected from the list of available TVWS channels received from the TVWS management server 400 into a plurality of sub-channels, assign at least one of the TVWS sub-channels to each of the central data processing unit 100, the sensor unit 200, and the actuator 300, and perform wireless communication with the central data processing unit 100, the sensor unit 200, or the actuator 300, or group the central data processing unit 100, the plurality of sensor units 200, and the actuator 300, assign the TVWS sub-channel to the group, and perform wireless communication with the central data processing unit 100, the plurality of sensor units 200, and the actuator 300 through at least one TVWS sub-channel by applying various division communication methods such as a TDM communication method, a CDM communication method, and the like. In this case, the controller 130 may adjust a number of the sub-channels to avoid excessive traffic in consideration of a transmission amount of information that can be transmitted through each of the sub-channels.

The data processing unit 131 may generate a control signal for controlling the actuator 300 inside the plant factory according to operational information including an environmental state of the inside and outside of the plant factory received from the sensor unit 200 through the TVWS communication unit 110 and a current operational state, whether or not there is a malfunction, and the like received from the actuator 300, and transmit the control signal to the actuator 300.

That is, the data processing unit 131 may receive the environmental state of the inside and outside of the plant factory from the sensor unit 200 according to a predetermined period or request sensing of the environmental state of the inside and outside of the plant factory from the sensor unit 200 as required and receive corresponding information from the sensor unit 200, generate the control signal for controlling the actuator 300 so that the received environmental state of the inside and outside of the plant factory reaches an optimal environmental state for growth of crops according to values such as light intensity, temperature, humidity, $CO_2$, and the like stored in the memory 140, and transmit the control signal to the corresponding actuator 300 through the TVWS communication unit 110.

The memory 140 may store optimal values of environmental conditions such as light intensity, temperature, humidity, $CO_2$, and the like affecting growth of crops according to a kind of crops inside the plant factory. In this case, the values such as light intensity, temperature, humidity, $CO_2$, and the like, which are the environmental conditions affecting the growth of the crops according to the kind of crops stored in the plant factory may be updated with data learned from the growth of the crops in the plant factory, or may be directly updated by a user.

Figure 4:
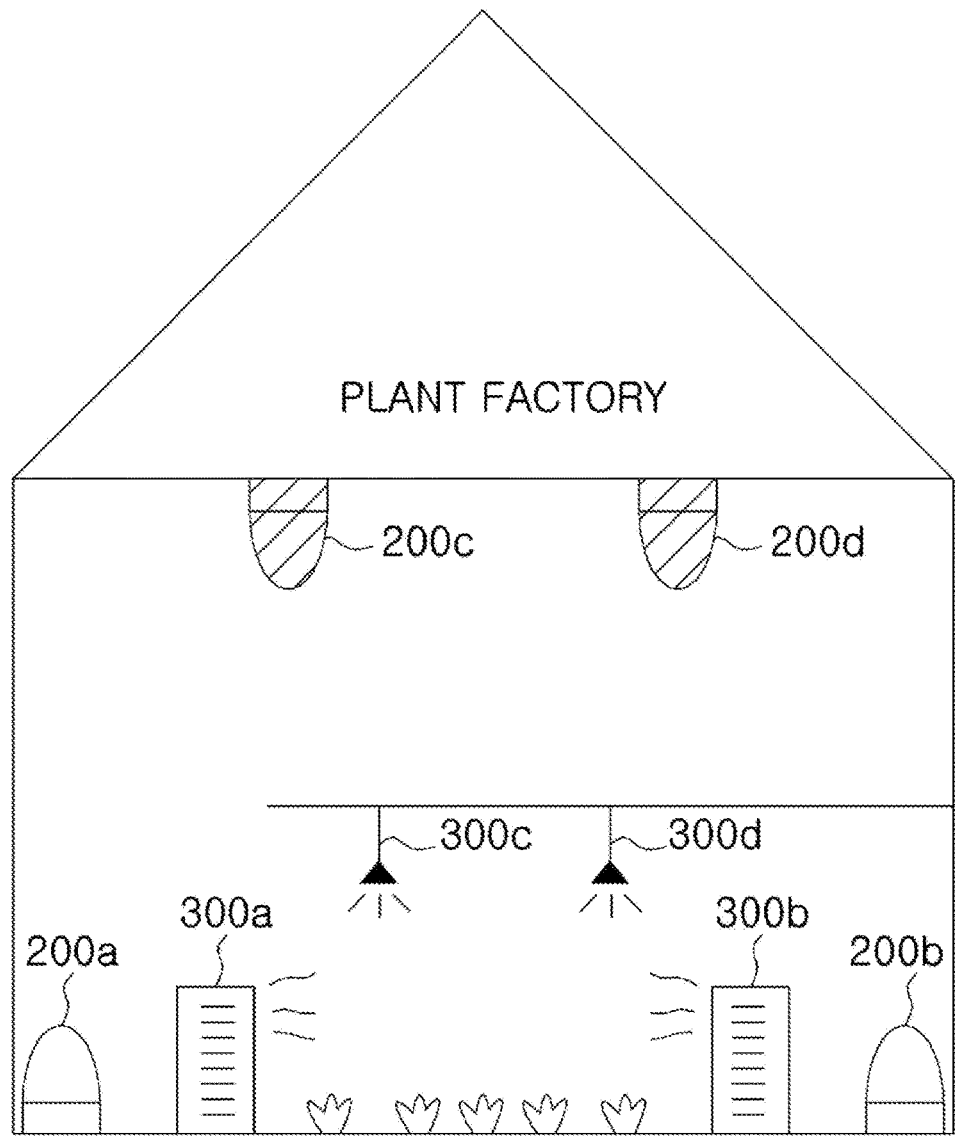
FIG. 4 is a view illustrating an example of the plant factory monitoring and control system illustrated in FIG. 1.

Meanwhile, FIG. 4 is a view illustrating an example of the plant factory monitoring and control system illustrated in FIG. 1.

Referring to FIG. 4, first and second humidity sensors 200a and 200b and first and second optical sensors 200c and 200d may be installed inside the plant factory, measure an environmental state of the inside of the plant factory, and transmit the environmental state to the central data processing unit 100. First and second humidifiers 300a and 300b and first and second artificial lighting devices 300c and 300d may be installed inside the plant factory and may create the environmental state of the inside of the plant factory according to a control signal received from the central data processing unit 100.

The central data processing unit 100 may receive humidity of the inside and outside of the plant factory from the first and second humidity sensors 200a and 200b according to a predetermined period or may request sensing of the environmental state from the first and second humidity sensors 200a and 200b as required and receive corresponding information, and generate a control signal for controlling the first and second humidifiers 300a and 300b. That is, the central data processing unit 100 may generate the control signal for controlling an operation of the first and second humidifiers 300a and 300b so that the humidity of the inside of the plant factory reaches an optimal humidity for growth of crops based on an optimum value of the humidity in the plant factory according to a kind of crops of the inside of the plant factory, and transmit the control signal to the first and second humidifiers 300a and 300b.

Further, the central data processing unit 100 may receive light intensity of the inside and outside of the plant factory from the first and second optical sensors 200c and 200d according to a predetermined period or may request sensing of environmental state from the first and second optical sensors 200c and 200d as required and receive corresponding information, and generate a control signal for controlling the first and second artificial lighting devices 300c and 300d. That is, the central data processing unit 100 may generate the control signal for controlling an operation of the first and second artificial lighting devices 300c and 300d so that the light intensity of the inside of the plant factory reaches an optimal light intensity for growth of crops based on an optimum value of the light intensity in the plant factory according to the kind of crops of the inside of the plant factory, and transmit the control signal to the first and second artificial lighting devices 300c and 300d.

Meanwhile, the central data processing unit 100 may assign a TVWS channel in order to perform TVWS-based wireless communication with the first and second humidity sensors 200a and 200b, the first and second optical sensors 200c and 200d, the first and second humidifiers 300a and 300b, and the first and second artificial lighting devices 300c and 300d. In this case, the central data processing unit 100 may select the TVWS channel that can cover the plurality of sensor units 200 and actuators 300, the TVWS channel to which highest transmission power is assigned, or the TVWS channel which receives the least interference. Meanwhile, when the TVWS channel which receives the least interference is selected, the degree of interference may be determined by measuring a difference between the transmission power of the channel and noise flow, which is a well-known method, and thus detailed description thereof will be omitted.

For example, the central data processing unit 100 may receive a list of TVWS channels ch4, ch5, and ch6 which are available at locations at which the first and second humidity sensors 200a and 200b, the first and second optical sensors 200c and 200d, the first and second humidifiers 300a and 300b, and the first and second artificial lighting devices 300c and 300d are installed and allowable transmission power of each of the TVWS channels from the TVWS management server 400.

Further, when the TVWS channel ch6 among the received list of the TVWS channels ch4, ch5, and ch6 can cover all of the sensor units 200 and the actuators 300 installed inside and outside the plant factory, the central data processing unit 100 may select the TVWS channel ch6 (not shown) as a TVWS channel that can be most appropriately used inside the plant factory.

Further, the central data processing unit 100 may entirely assign the TVWS channel ch6 which is the selected TVWS channel to the inside and outside of the plant factory, and perform wireless communication with the first and second humidity sensors 200a and 200b, the first and second optical sensors 200c and 200d, the first and second humidifiers 300a and 300b, and the first and second artificial lighting devices 300c and 300d through the TVWS channel ch6 by applying various division communication methods such as a TDM communication method, a CDM communication method, and the like.

Alternatively, the central data processing unit 100 may divide the TVWS channel ch6 which is the selected TVWS channel into a plurality of sub-channels ch6-1, ch6-2, ch6-3, ch6-4, ch6-5, ch6-6, ch6-7, and ch6-8 (not shown), assign the sub-channels to the first and second humidity sensors 200a and 200b, the first and second optical sensors 200c and 200d, the first and second humidifiers 300a and 300b, and the first and second artificial lighting devices 300c and 300d, respectively, and perform wireless communication. According to one embodiment of the present disclosure, for example, the central data processing unit 100 may assign one TVWS sub-channel to the plurality of sensor units 200 and actuators 300 rather than assigning one TVWS sub-channel to each of the sensor unit 200 or the actuator 300, and perform wireless communication with the plurality of sensor units 200 and actuators 300 through the one TVWS sub-channel by applying various division communication methods such as a TDM communication method, a CDM communication method, and the like.

Alternatively, the central data processing unit 100 may group the sensor units 200 and the actuators 300 installed in a region adjacent to the inside and outside of the plant factory, select a plurality of TVWS channels that can cover the sensor units 200 and the actuators 300 included in a corresponding group, assign the TVWS channel to each group, perform a link connection of the central data processing unit 100 and the plurality of sensor units 200 and actuators 300 by applying a multi-hop method, and perform wireless communication with the plurality of sensor units 200 and actuators 300 through the plurality of TVWS channels by applying a TDM communication method or a CDM communication method.

Figure 5A:
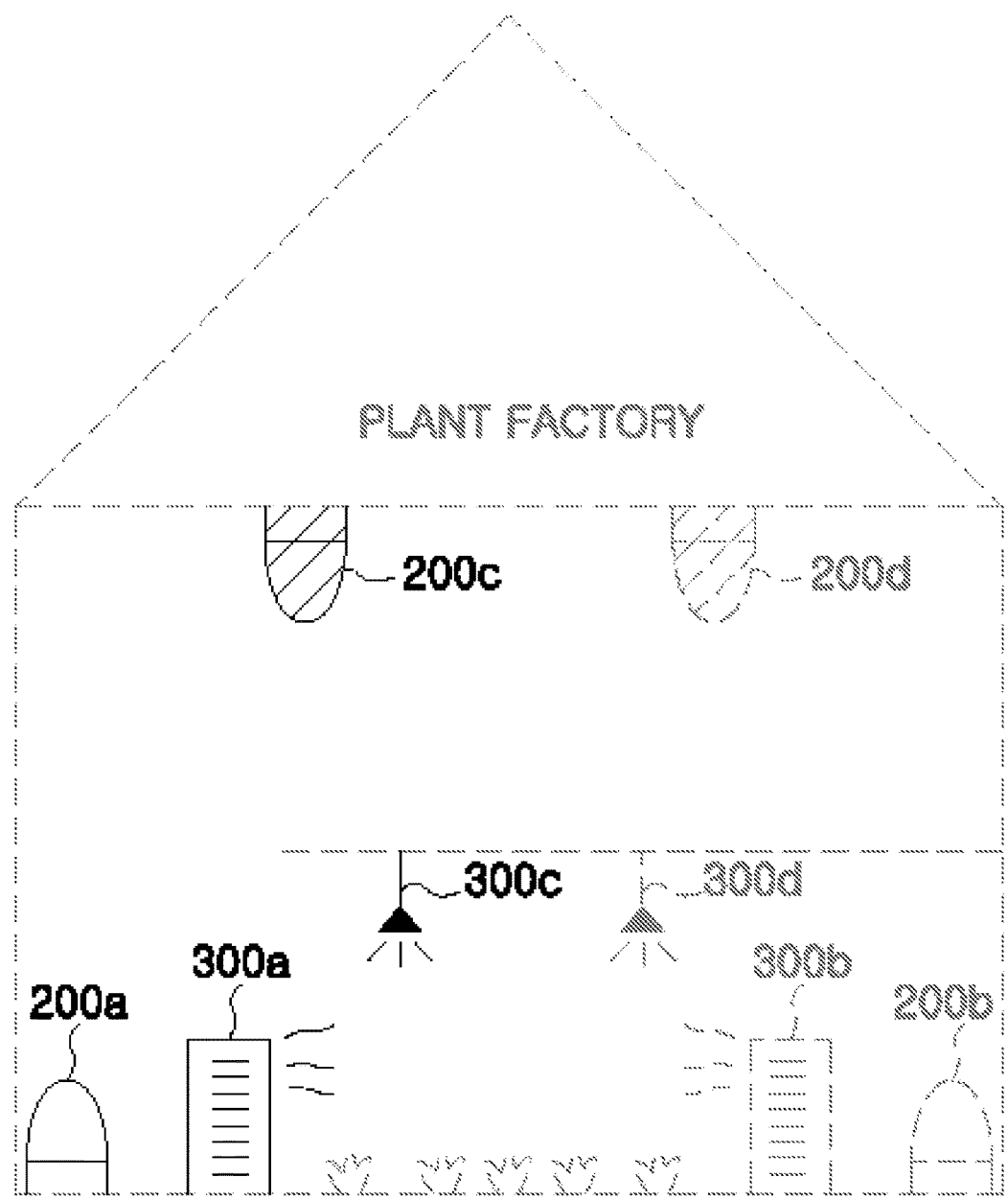
FIGS. 5A and 5B are views illustrating other examples of the plant factory monitoring and control system illustrated in FIG. 1.

For example, referring to FIG. 5A, the central data processing unit 100 may group the first humidity sensor 200a, the first optical sensor 200c, the first humidifier 300a, and the first artificial lighting device 300c, which are installed on a left side of the plant factory, assign the TVWS channel ch4 (not shown) to the components installed on the left side of the plant factory when the TVWS channel ch4 can cover the first humidity sensor 200a, the first optical sensor 200c, the first humidifier 300a, and the first artificial lighting device 300c, which are installed on the left side of the plant factory, among the list of TVWS channels available inside and outside the plant factory received from the TVWS management server 400 including TVWS channels ch4, ch5, and ch6, and perform wireless communication with the first humidity sensor 200a, the first optical sensor 200c, the first humidifier 300a, and the first artificial lighting device 300c through the TVWS channel ch4 by applying a TDM communication method or a CDM communication method.

Figure 5B:
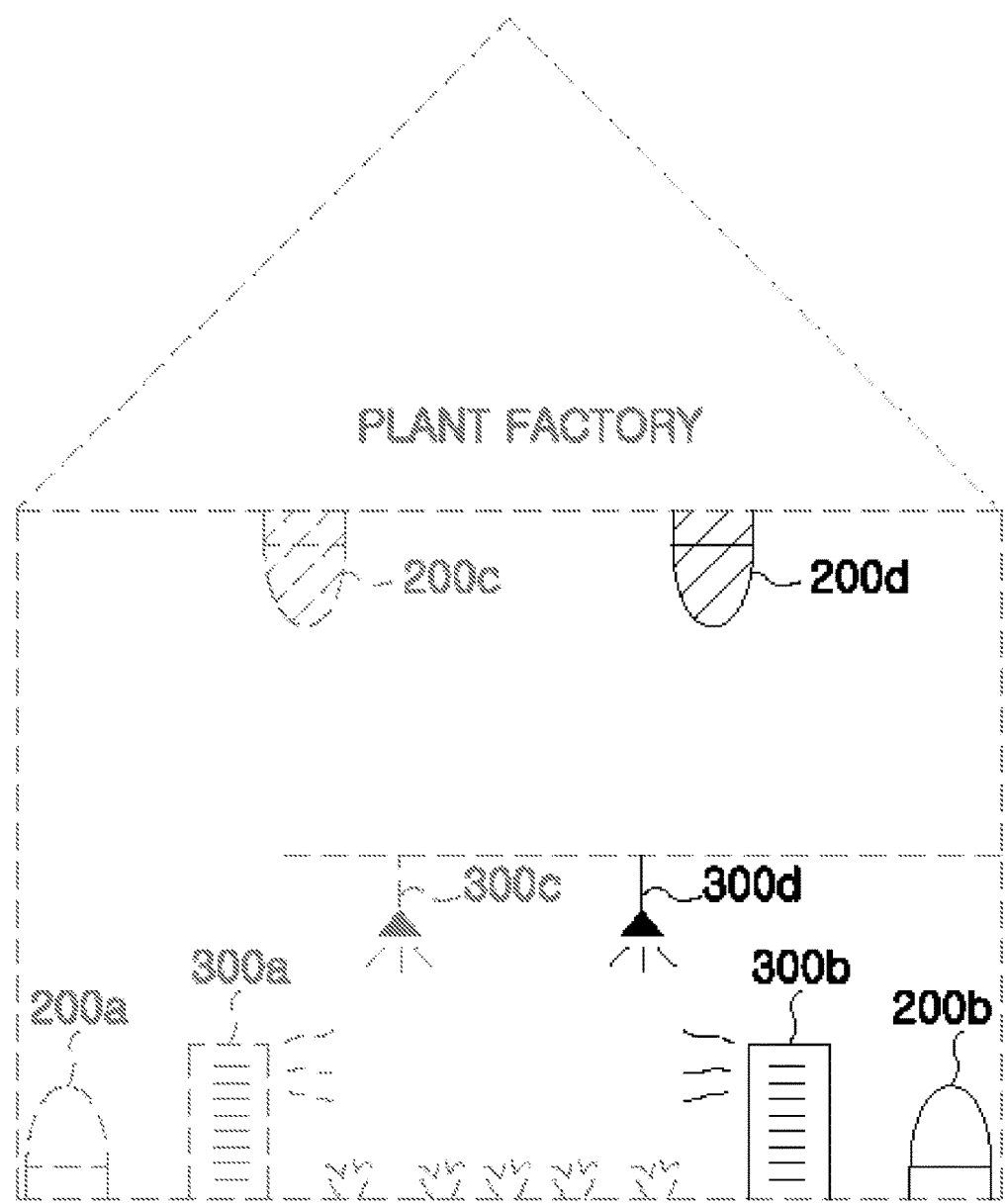

Further, referring to FIG. 5B, the central data processing unit 100 may group the second humidity sensor 200b, the second optical sensor 200d, the second humidifier 300b, and the second artificial lighting device 300d, which are installed on a right side of the plant factory, assign the TVWS channel ch5 to the components installed on the right side of the plant factory when the TVWS channel ch5 can cover the second humidity sensor 200b, the second optical sensor 200d, the second humidifier 300b, and the second artificial lighting device 300d, which are installed on the right side of the plant factory, among the list of TVWS channels available inside and outside the plant factory received from the TVWS management server 400 including TVWS channels ch4, ch5, and ch6, and perform wireless communication with the second humidity sensor 200b, the second optical sensor 200d, the second humidifier 300b, and the second artificial lighting device 300d through the TVWS channel ch5 by applying a TDM communication method or a CDM communication method.

Figure 6:
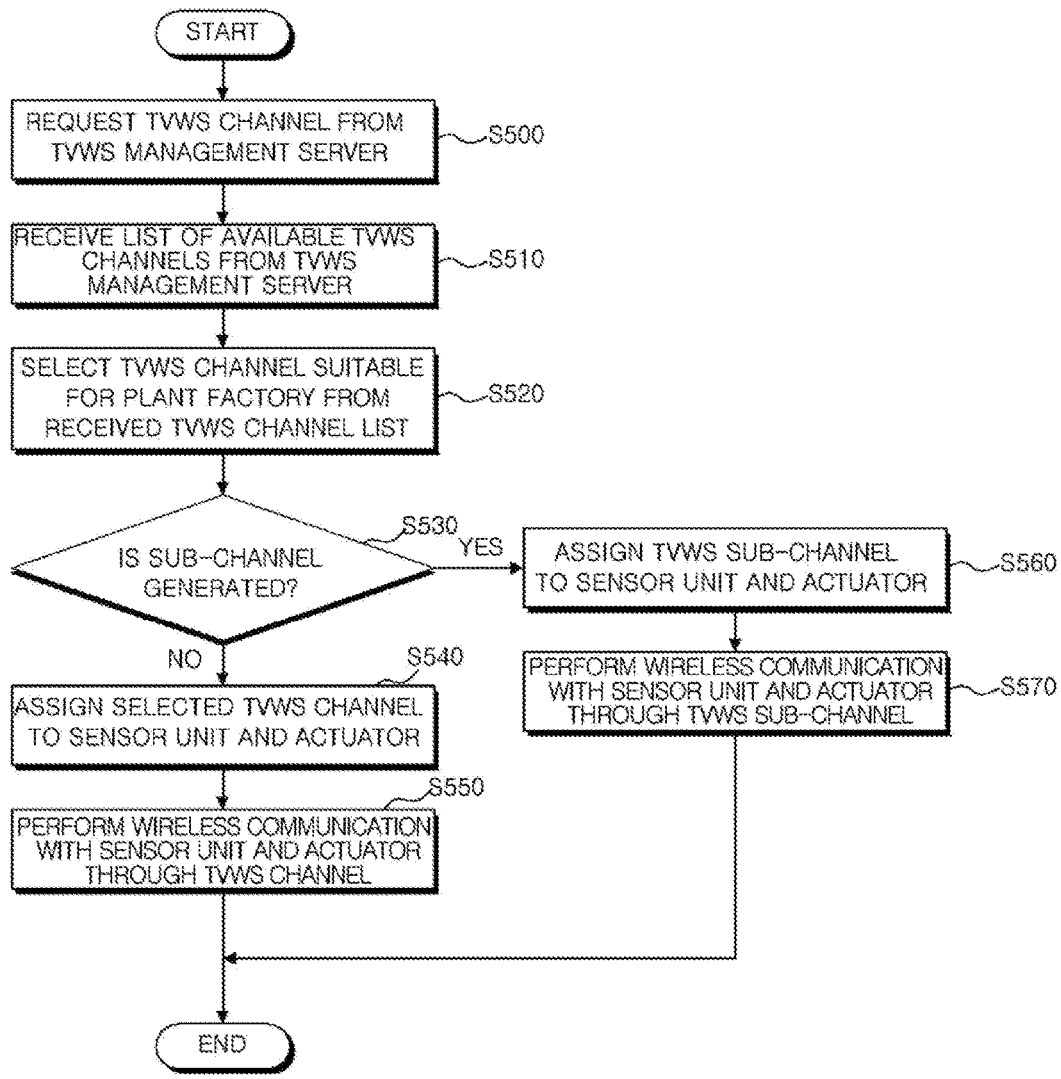
FIG. 6 is a flowchart illustrating a detailed operational procedure of a plant factory monitoring and control method according to another embodiment of the present disclosure.

Meanwhile, FIG. 6 is a flowchart illustrating a detailed operational procedure of a plant factory monitoring and control method according to another embodiment of the present disclosure.

Referring to FIG. 6, first, the central data processing unit 100 may request a TVWS channel from the TVWS management server 400 (S500). The central data processing unit 100 may be connected to the TVWS management server 400, intermittently, each time the TVWS channel is required, or according to a predetermined regulation, using various communication networks such as the Internet, a cellular network, and the like in accordance with conditions, and may request the TVWS channel from the TVWS management server 400. That is, the central data processing unit 100 may be connected to the TVWS management server 400, may transmit management information including location information on the central data processing unit 100 and location information on the plurality of sensor units 200 and actuators 300 which are installed inside and outside the plant factory to the TVWS management server 400, and request at least one TVWS channel available inside and outside the plant factory from the TVWS management server 400.

Further, the central data processing unit 100 may receive a TVWS channel list including at least one TVWS channel available inside and outside the plant factory and allowable transmission power of each of the TVWS channels from the TVWS management server 400 (S510).

Further, the central data processing unit 100 may select a TVWS channel suitable for use in the plant factory from the TVWS channel list received from the TVWS management server 400 (S520). The central data processing unit 100 may select a TVWS channel that can cover the plurality of sensor units 200 and actuators 300, a TVWS channel to which highest transmission power is assigned, or a TVWS channel which receives the least interference from the TVWS channel list.

Further, the central data processing unit 100 may divide the selected TVWS channel into a plurality of sub-channels (S530).

When the sub-channels are not generated by dividing the TVWS channel, the central data processing unit 100 may assign the selected TVWS channel to all of the central data processing unit 100, the sensor unit 200, and the actuator 300, which are installed inside and outside the plant factory (S540), and perform wireless communication with the sensor unit 200 and the actuator 300 through the TVWS channel by applying a TDM communication method or a CDM communication method (S550).

In this case, the central data processing unit 100 may group the sensor units 200 and the actuators 300 installed in a region adjacent to the inside and outside of the plant factory, and select a plurality of TVWS channels that can cover the sensor unit 200 and the actuator 300 included in the corresponding group, assign the TVWS channel to each group, and perform wireless communication with the plurality of sensor assemblies 200 and actuators 300 through the plurality of TVWS channels by applying a TDM communication method or a CDM communication method.

Meanwhile, when the sub-channels are generated by dividing the TVWS channel, the central data processing unit 100 may assign each of the TVWS sub-channels to the central data processing unit 100, the sensor unit 200, and the actuator 300 (S560) and perform wireless communication with one sensor unit 200 and one actuator 300 through one TVWS sub-channel, or may assign the TVWS sub-channel to the central data processing assembly 100 and the plurality of sensor units 200 and actuators 300 and perform wireless communication with the plurality of sensor units 200 and actuators 300 through one TVWS sub-channel by applying a TDM communication method or a CDM communication method (S570).

In this manner, the plant factory monitoring and control method based on the TVWS may be implemented as an application, or may be implemented in the form of computer instructions that can be performed through various computer components and may be recorded in computer readable recording media. The computer readable recording media may include a program instruction, a data file, and a data structure, and/or combinations thereof.

The program instructions recorded in the computer readable recording media may be specially designed and prepared for the disclosure or may be well known and available to those skilled in the field of computer software.

Examples of the computer readable recording media include, for example, magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a random access memory (RAM), or a flash memory, that is specially made to store and perform the program instructions.

Examples of the program instructions may include a machine code generated by a compiler and a high-level language code that can be executed in a computer using an interpreter. Such a hardware device may be configured as at least one software module in order to perform operations of the disclosure and vice versa.

According to an aspect of the present disclosure described above, as the plant factory monitoring and control system is provided, an environmental state of the inside and outside of a plant factory is monitored, the environmental state of the inside of the plant factory is always maintained in an optimal condition for growth of crops, and thus time and power for optimizing a crop-growing environment can be reduced.

Further, as a plant factory monitoring and control system through TVWS-based wireless communication which provides wider coverage than wireless communication based on industrial, scientific, and medical (ISM) bands is provided, since the wireless communication is possible even when a small number of wireless systems are installed, initial installation costs can be reduced, and since additional communication costs are not incurred other than the initial installation costs, unlike a cellular communication method in which additional communication costs are continuously incurred in the communication process, costs for operating the plant factory can be reduced.

Further, as a plant factory monitoring and control system through TVWS-based wireless communication, which has excellent electric wave characteristics allowing it to be used in places that other communication networks do not reach, is provided, the plant factory monitoring and control system in which excellent quality of crops may be grown is not limited to a particular region.

Further, as a communication method using a TVWS channel divided into a plurality of sub-channels is provided, frequency usage can be increased and thus limited channels can be efficiently used.

While the present disclosure has been described above with reference to the embodiments, it may be understood by those skilled in the art that various modifications and alterations may be made without departing from the spirit and scope of the present disclosure described in the appended claims.

What is claimed is:

1. A plant factory monitoring and control system comprising:
   a sensor assembly installed inside and outside a plant factory and measuring an environmental state;
   an actuator assembly installed inside the plant factory and creating a growing environment; and
   a central data processing assembly assigning a TV white space (TVWS) channel to the sensor assembly and the actuator assembly, receiving the environmental state from the sensor assembly through the TVWS channel, generating a control signal controlling the actuator assembly to meet a predetermined conditions for an internal environment of the plant factory for an optimal state of growth of crops in response to the environmental state, and transmitting the control signal to the actuator assembly through the TVWS channel,
   wherein an assignment of the TVWS channel to the sensor assembly and the actuator assembly comprises:
   connecting to a TVWS management server,
   requesting a TVWS channel list based on locations of the central data processing assembly, the sensor assembly, and the actuator assembly from the TVWS management server,
   receiving the TVWS channel list from the TVWS management server, selecting at least one TVWS channel from the TVWS channel list, and assigning the at least one TVWS channel to the central data processing assembly, the sensor assembly, and the actuator assembly.

2. The plant factory monitoring and control system of claim 1, wherein the sensor assembly comprises a sensor installed inside and outside the plant factory and measuring at least one of temperature, humidity, $CO_2$, electrical conductivity (EC), illuminance, light intensity, culture medium temperature, culture medium moisture, solar radiation, wind velocity, a wind direction, and rainfall, wherein the sensor comprises a TVWS communication terminal performing TVWS communication.

3. The plant factory monitoring and control system of claim 1, wherein the actuator assembly comprises at least one of artificial lighting, a humidifier, a dehumidifier, a water supply, a ceiling motor, a side window motor, a curtain motor, a screen motor, a flow fan, a ventilation fan, a $CO_2$ supply, a convection fan, an air conditioner, and a heater, which is installed inside the plant factory, wherein the actuator assembly comprises a TVWS communication terminal performing a TVWS communication.

4. The plant factory monitoring and control system of claim 1, wherein the selecting of the at least one TVWS channel and the assigning of the at least one TVWS channel comprise:

selecting a TVWS channel from the at least one TVWS channel included in the TVWS channel list according to at least one of coverage, transmission power, and a degree of interference in the vicinity, and assigning the TVWS channel to the central data processing assembly, the sensor assembly, and the actuator assembly.

5. The plant factory monitoring and control system of claim 4, wherein the selecting of the TVWS channel comprises:

selecting a first TVWS channel from the TVWS channel list, the first TVWS channel assigned the inside and outside of the plant factory and covering the central data processing assembly, the sensor assembly, and the actuator assembly which are installed inside and outside the plant factory.

6. The plant factory monitoring and control system of claim 5, wherein the selecting of the TVWS channel further comprises:

grouping the central data processing assembly, the sensor assembly, and the actuator assembly installed in a region adjacent to the inside and outside of the plant factory, and selecting a plurality of TVWS channels covering the central data processing assembly, the sensor assembly, and the actuator assembly from a corresponding group, and assigning the plurality of TVWS channels to each of the corresponding group.

7. The plant factory monitoring and control system of claim 6, wherein the selecting of the TVWS channel further comprises:

selecting at least one TVWS channel from the TVWS channel list, dividing the at least one TVWS channel into a plurality of sub-channels, and assigning the plurality of sub-channels to the sensor assembly and the actuator assembly.

8. The plant factory monitoring and control system of claim 7, wherein the central data processing assembly transmits and receives information to and from the sensor assembly and the actuator assembly through the TVWS channel by applying a time division multiplexing (TDM) communication method or a code division multiplexing (CDM) communication method.

* * * * *